(12) United States Patent
Jin

(10) Patent No.: US 7,748,595 B2
(45) Date of Patent: Jul. 6, 2010

(54) APPARATUS AND METHOD FOR HOT BONDING METAL PLATES

(76) Inventor: In Tai Jin, Namsan Tower 2-Cha Apt. 802, 1509-4, Daeyeon 5-dong, Nam-gu, Busan-city (KR) 608-818

( * ) Notice: Subject to any disclaimer, the term of this patent is extended or adjusted under 35 U.S.C. 154(b) by 244 days.

(21) Appl. No.: 11/817,707

(22) PCT Filed: Mar. 8, 2006

(86) PCT No.: PCT/KR2006/000818

§ 371 (c)(1),
(2), (4) Date: Sep. 4, 2007

(87) PCT Pub. No.: WO2006/096010

PCT Pub. Date: Sep. 14, 2006

(65) Prior Publication Data

US 2008/0190992 A1 Aug. 14, 2008

(30) Foreign Application Priority Data

Mar. 8, 2005 (KR) .................... 10-2005-0019045

(51) Int. Cl.
*B23K 37/00* (2006.01)
(52) U.S. Cl. .................... 228/44.3; 228/173.6
(58) Field of Classification Search ........... 228/44.3, 228/173.6
See application file for complete search history.

(56) References Cited

U.S. PATENT DOCUMENTS

| 3,325,623 A * | 6/1967 | Briggs, III ............ 219/102 |
| 5,720,425 A * | 2/1998 | Tazoe et al. .......... 228/171 |
| 2001/0017312 A1 * | 8/2001 | Horii et al. ............ 228/173.6 |

FOREIGN PATENT DOCUMENTS

| JP | 61-012005 U | 1/1986 |
| JP | 05-245507 A | 9/1993 |
| JP | 07-047408 A | 2/1995 |
| JP | 10-058006 A | 3/1998 |
| JP | 2000-051906 A | 2/2000 |

* cited by examiner

*Primary Examiner*—Jessica L Ward
*Assistant Examiner*—Nicholas P D'Aniello

(57) ABSTRACT

The present invention relates to an apparatus and a method for hot bonding metal plates having advantages that removing an oxidation film of the metal plates and bonding the metal plates are simultaneously accomplished and a bonding force between the metal plates is enhanced by applying a strong bonding pressure to the metal plates. The present invention has advantages that overlapped metal plates are compressed vertically and a shaving blade is formed at a shaving mold. Therefore, as the metal plates move, an oxidation film coated on the overlapped surfaces of the metal plates is removed. In addition, a home is formed at the shaving mold so that excess metal together with an oxidation film coated on front portions of the metal plates are removed and simultaneously the metal plates are bonded with a strong pressure.

10 Claims, 11 Drawing Sheets

APPARATUS AND METHOD FOR HOT BONDING METAL PLATES

BACKGROUND OF THE INVENTION (a) Field of the Invention

The present invention relates to an apparatus and a method for hot bonding metal plates. More particularly, the present invention relates to an apparatus and a method for hot bonding metal plates having advantages that removing an oxidation film of the metal plates and bonding the metal plates are simultaneously accomplished and a bonding force between the metal plates is enhanced by applying a strong bonding pressure to the metal plates.

(b) Description of the Related Art

Generally, a welding method is well known as the method for bonding two metal plates. However, if the metal plates are thick or materials of the metal plates are different from each other, it is difficult to bond the metal plates with the welding method. Especially, in a hot rolling process, thick moving metal plates need to be rapidly bonded so as to continuously roll the metal plates. Thus, a welding method is rarely used in the hot rolling process.

Therefore, a bonding method is used for bonding the metal plates in the hot rolling process. However, an impurity, such as an oxidation film, coated on bonding surfaces of the metal plates needs to be removed according to the bonding method. Therefore, an additional, preceding process for removing the oxidation film is required.

Recently, a method for removing the oxidation film and simultaneously bonding the metal plates has been investigated.

For example, a method for overlapping two metal plates that are not cut and then bonding the two metal plates by applying a pressure with upper and lower cutting blades having a triangular-prism-shaped protrusion portion in an inclined direction to the normal of the surface of the metal plates is disclosed in Korean Patent Laid-open Publication No. 2001-0062404. In this case, the metal plates are clamped by the triangular-prism-shaped protrusion portion and the bonding surfaces are compressed by the triangular-prism-shaped protrusion portion so as to enhance the bonding force between the metal plates. In addition, since the bonding surfaces of the metal plates are formed along the inclined direction to the normal of the metal plates' surface, the metal plates are bonded well in a successive rolling process.

However, if the metal plates are clamped by the triangular-prism-shaped protrusion portion, the pressure applied to the bonding surfaces may be low and flaws may occur at the metal plates.

In addition, a method for respectively forming protrusions and depressions as the slanted shape at the two metal plates and tightly fitting the protrusions and depressions of one metal plate to the protrusions and depressions of the other metal plate so as to enhance the bonding force is disclosed in Korean Patent No. 0293284.

However, an additional process for forming the protrusions and depressions may be needed and a sufficient pressure for bonding the metal plates may not be obtained since the protrusions and depressions are formed as the slanted shape.

A method for fixing the two metal plates by clamps, cutting the metal plates with reference to one clamping surface, and then applying a bonding load to a bonding surface is disclosed in Korean Patent No. 0382011.

As described above, most methods for bonding hot metal plates are such that a cutting surface is formed at a front portion of the metal plates and simultaneously a pressure is applied to the cutting surface of the metal plates by a clamp.

To bond the front portion of the metal plates, the cutting surface is formed by a cutting mold and the bonding pressure is applied to the cutting surface by a simple clamping operation according to the method described above.

According to the method described above, the pressure may not be applied horizontally to the front portion of the metal plates since the length of the metal plates are longer than the width of the metal plates. Therefore, the metal plates are overlapped instead of confronting the front end of the metal plates and the cutting load is applied to the overlapped metal plates so as to bond the metal plates. For example, in a state that the two metal plates are fixed by the clamp, the pressure is applied to the metal plates in the normal direction of the metal plates' surface so as to cut the metal plates and apply the bonding pressure along the surface of the metal plates. In this case, since the metal plates are cut and simultaneously bonded, an impurity, such as an oxidation film, may not be inserted into the bonding surface of the metal plates. However, since the metal plates are bonded just by the cutting and clamping force, the bonding pressure that is applied to the bonding surface in the normal direction of the bonding surface may be weakened. To solve this problem, many researches related to improving the shape of a cutting blade have been made.

In contrast, a method for overlapping front surfaces of the metal plates and then forming a bonding surface at the overlapped surfaces is disclosed in Korean Patent No. 0261204. According to this method, after an oxidation film of a bonding surface is mechanically removed by a reducing flame, the metal plates are bonded by pressing bonding portions of the metal plates.

However, a preceding process for removing the oxidation film so as to bond the overlapped surfaces of the metal plates is required and a trimming process may be performed since metal is pushed out in the width direction and a width of the metal plates are widened.

In cases that the metal plates are bonded with a strong forging pressure instead of cutting the metal plates, the bonding pressure may be strong. However, many problems may occur such as that a preceding process for removing the oxidation film coated on the bonding surfaces of the metal plates may be performed and the additional trimming process may be performed since the metal is pushed out in the width direction and the width of the metal plates are widened. To solve these problems, the metal plates are formed such that a width of the overlapped portions of the metal plates is narrower than that of the other portions of the metal plates. Therefore, in this case, an additional trimming process is not needed However, in this case, an additional process for narrowing the overlapped potions of the metal plates may be performed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has a first advantage that movement of the two metal plates is restricted and a strong bonding pressure is maintained since a vertical pressure is applied to an overlapped portion of the metal plates by a clamp that can apply a strong clamping force.

The present invention has a second advantage that metal, together with an oxidation film, is not pushed in the width direction of the metal plates but is pushed out to a home formed at a shaving mold when the metal plates are bonded.

The present invention has a third advantage that a bonding force is enhanced by shaving the oxidation film and bonding the overlapped metal plates through a plastic flow by a strong pressure in a sealed bonding mold.

The present invention has a fourth advantage that when the metal plates are inserted into the bonding mold, the oxidation film is shaved by a shaving blade mounted in the bonding mold and the shaved oxidation film is gathered to the home of the shaving mold so that a bonding process and a process for shaving the oxidation film are simultaneously performed.

According to the present invention, trumpet-shaped entrances are formed at both sides of the bonding mold, a height of the trumpet-shaped entrances increases in an outward direction, and the metal plates are inserted to an exact position where the metal plates are bonded so that a front portion of a following metal plate and a front portion of a preceding metal plate are easily inserted into the bonding mold. In addition, the metal plates are moved and simultaneously bonded according to the present invention. In addition, according to the present invention, a plurality of wheels are mounted on a lower end of the bonding mold so that the bonding mold is moved together with the metal plates and simultaneously the metal plates are bonded.

To solve the above problems, according to the present invention, the overlapped metal plates are compressed vertically, an excess material and the oxidation film are pushed out to the home of the shaving mold instead of being pushed out in the width direction of the metal plates, and simultaneously the metal plates are bonded through the plastic flow.

According to the present invention, the overlapped portions of the metal plates are shaved by a shaving blade of the shaving mold mounted at the front portions of the metal plates so that the oxidation film is shaved when the metal plates are inserted into the bonding mold, and the shaved oxidation film is gathered to the home formed at a front portion of the shaving mold. Therefore, the oxidation film is shaved automatically and the metal plates are bonded.

According to the present invention, the oxidation film and the front portions of the metal plates are pushed out to the home of the shaving mold through the plastic flow as the metal plates are bonded so that the oxidation film is removed automatically and the metal plates are bonded in pure metal states. Therefore, a preceding process for removing the oxidation film and an additional process for trimming the excess metal are not needed and bonding the metal plates strongly and removing the oxidation film are simultaneously accomplished according to the present invention.

In addition, according to the present invention, in a successive hot rolling process where the metal plate is moving, wheels are mounted on a lower end of a bonding apparatus so that a front portion of a following metal plate is automatically inserted into the bonding mold through the trumpet-shaped entrance and the bonding apparatus is moved by an inertial force of the moving following metal plate. In addition, according to the present invention, a stopped preceding metal plate is automatically inserted into the moving bonding mold through the trumpet-shaped entrance of the bonding mold so that the two metal plates are automatically overlapped in a bonding position and are bonded in moving states.

An exemplary apparatus for hot bonding metal plates by applying a pressure to overlapped metal plates according to an embodiment of the present invention includes: a supporting frame; an upper bonding mold being mounted on an upper portion of the supporting frame and having a clamping cylinder for clamping the metal plates; a lower bonding mold being mounted on a lower portion of the supporting frame and having a clamping cylinder for clamping the metal plates; shaving molds having a shaving blade for shaving an oxidation film of the metal plates and an excess metal; a lower clamp being installed corresponding to the upper bonding mold, a shaving mold inserted therein so that the shaving mold can move horizontally; and an upper clamp being installed corresponding to the lower bonding mold, a shaving mold inserted therein so that the shaving mold can move horizontally.

The clamping cylinders of the upper and lower bonding molds may be respectively connected to the upper and lower clamps with cylinder rods.

The upper bonding mold and the upper clamp may be formed as male forms and the lower bonding mold and the lower clamp may be formed as female forms that enclose the upper bonding mold and the upper clamp respectively so that the upper bonding mold and the lower clamp and the lower bonding mold and the upper clamp are closely engaged with each other.

Pluralities of rods may be respectively formed at one side of the shaving molds, pluralities of spring insert holes into which the pluralities of rods are inserted may be bored horizontally at a lower portion of the upper clamp and an upper portion of the lower clamp, and a supporting portion for supporting exhausting springs may be formed in the spring insert holes.

The shaving molds may have a curved surface at an opposite side to the one side where the rods are formed.

A remnant keeping home may be formed at the one side of each shaving mold where the metal plates are contacted.

Trumpet-shaped entrances into which the metal plates are inserted may be formed at left and right sides of the upper and lower bonding molds and the upper and lower clamps, wherein a height of the trumpet-shaped entrances increases in an outward direction.

Sliding rods are respectively mounted on upper and lower ends of the upper and lower clamps, and stoppers are respectively mounted on upper and lower ends of the sliding rods so as to control a position of the upper and lower clamps according to a thickness of the metal plates.

The sliding rods may be elastically supported by protruding springs.

An upper portion of the upper bonding mold may be elongated to the upper clamp, and the sliding rods connected to the upper end of the upper clamp may penetrate the elongated portion of the upper bonding mold.

Wheels may be mounted on a lower end of the supporting frame.

Meanwhile, according to an exemplary method for hot bonding metal plates by supplying a pressure to overlapped metal plates, the metal plates may be inserted into a bonding mold for bonding the overlapped metal plates and simultaneously an oxidation film of an overlapped surface of the metal plates may be shaved by a shaving blade for shaving the overlapped metal plates.

In addition, the metal plates may be bonded by applying a pressure to the metal plates and simultaneously an excess metal after the bonding is pushed out to an excess metal keeping home for keeping the excess metal.

DESCRIPTION OF REFERENCE NUMERALS INDICATING PRIMARY ELEMENTS IN THE DRAWINGS

| | |
|---|---|
| 1: metal plate | 2: left metal plate |
| 3: right metal plate | 4: front portion of metal plate |
| 5: overlapped surface | 6: excess metal |
| 7: upper bonding mold | 8: lower bonding mold |
| 9: upper clamp | 10: lower clamp |
| 11: shaving mold | 12: shaving blade |
| 12a: curved surface | 13: remnant keeping home |
| 14: excess metal keeping home | 15: exhausting spring |
| 16: protruding spring | 17: stopper |
| 18: sliding rod | 19: trumpet-shaped entrance |
| 20: inserting roller | 21: clamping cylinder |
| 22: bonding cylinder | 23: supporting frame |
| 24: wheel | 25: hydraulic pressure tank |
| 26: hydraulic pressure pump | 27: heater insert home |

DETAILED DESCRIPTION OF THE EMBODIMENT

An exemplary apparatus for hot bonding metal plates according to an embodiment of the present invention will hereinafter be described in detail with reference to the accompanying drawings.

Figure 1:
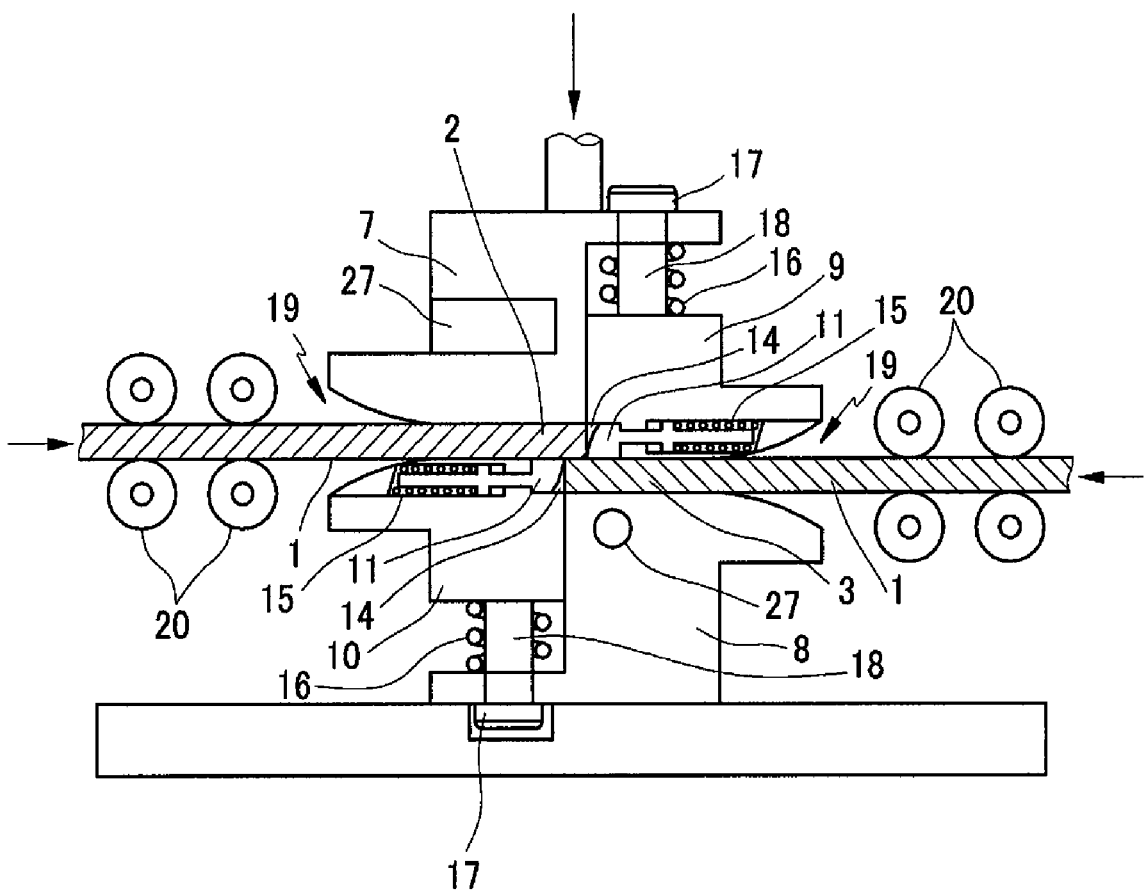
FIG. 1 shows a cross-sectional view of a bonding mold according to an exemplary embodiment of the present invention.

FIG. 1 shows a cross-sectional view of a bonding mold according to an exemplary embodiment of the present invention.

As shown in FIG. 1, metal plates are overlapped by an upper bonding mold 7 and a lower bonding mold 8, and a compression load is vertically applied to the overlapped surfaces 5 according to the present invention. In this case, an oxidation film of the metal plates is shaved by shaving molds 11 mounted on front portions of clamps and simultaneously the overlapped surfaces 5 of the metal plates 1 are bonded.

A bonding force in a case of using a conventional cutting blade may be stronger than the bonding force in the case of using the upper and lower bonding molds 7 and 8. However, many problems may occur such that an oxidation film coated on the overlapped surfaces 5 and the front portions 4 of the metal plates 1 needs to be removed and an additional process for trimming excess metal 6 pushed out in the width direction of the metal plates 1 during the bonding process is needed.

To gain a strong bonding force, as shown FIG. 1, the oxidation film of the overlapped surfaces 5 is shaved by shaving blades 12 before the two metal plates 1 are overlapped and excess metal keeping homes 14 are formed in front of the shaving blades 12 so that excess metal 6 is pushed to the excess metal keeping homes 14 of the shaving molds 11 and simultaneously the oxidation film of the front portions 4 of the metal plates is removed to the excess metal keeping homes 14. Therefore, an additional trimming process is not required and the overlapped metal plates are bonded strongly according to the exemplary embodiment of the present invention. The excess metal keeping homes 14 are formed as a trapezoidal shape.

As shown in FIG. 1, a right metal plate 3 is supported by the lower bonding mold 8 and a front portion of a left metal plate 2 is overlapped to a front portion of the right metal plate 3. When the upper bonding mold 7 is closely contacted to an upper clamp 9 and slides down, a compression load is vertically applied to the overlapped metal plates 1 that are laid between the upper and lower bonding molds 7 and 8. Therefore, the overlapped metal plates 1 are pressed and bonded through a plastic flow.

In addition, sliding rods 18 are respectively mounted on upper and lower portions of the upper and lower clamps 9 and 10, and stoppers 17 are respectively mounted on upper and lower portions of the sliding rods 18 so as to control a position of the upper and lower clamps 9 and 10 according to a thickness of the metal plates 1. In addition, the sliding rods 18 are elastically supported by protruding springs 16 so that, when the metal plates 1 are bonded and then the bonding molds 7 and 8 are separated, the upper and lower clamps 9 and 10 are respectively bounced upwardly and downwardly by a restoring force of the protruding springs 16 so as to exhaust the excess metal 6 and the oxidation film remnant.

FIG. 2 shows a process for inserting the metal plates into the bonding mold and overlapping the metal plates according to the exemplary embodiment of the present invention.

Figure 2A:
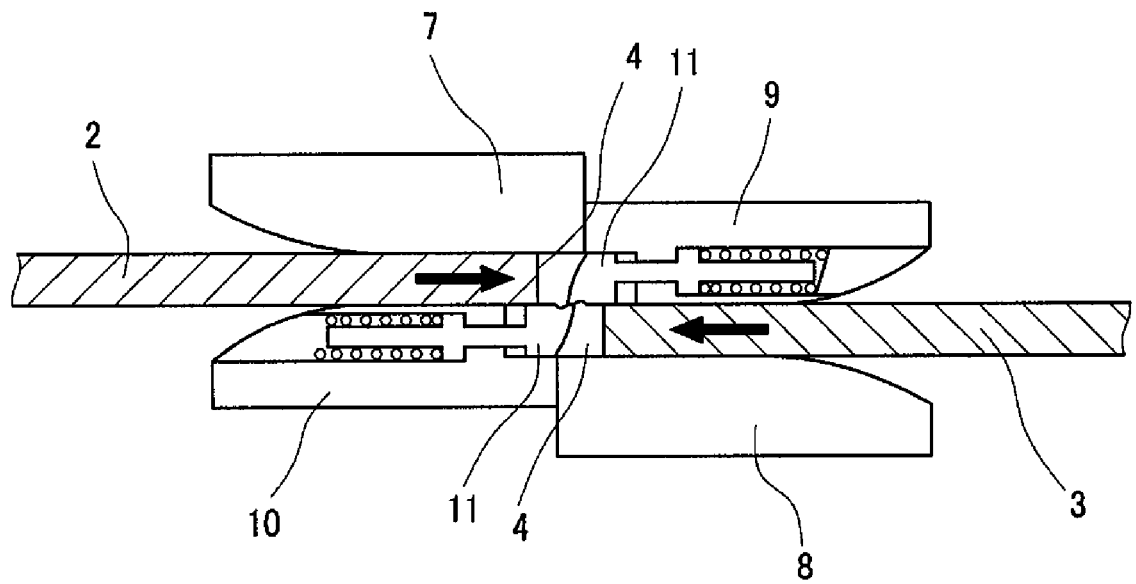
FIG. 2 shows a process for inserting the metal plates into the bonding mold and overlapping the metal plates according to the exemplary embodiment of the present invention.
Figure 2B:
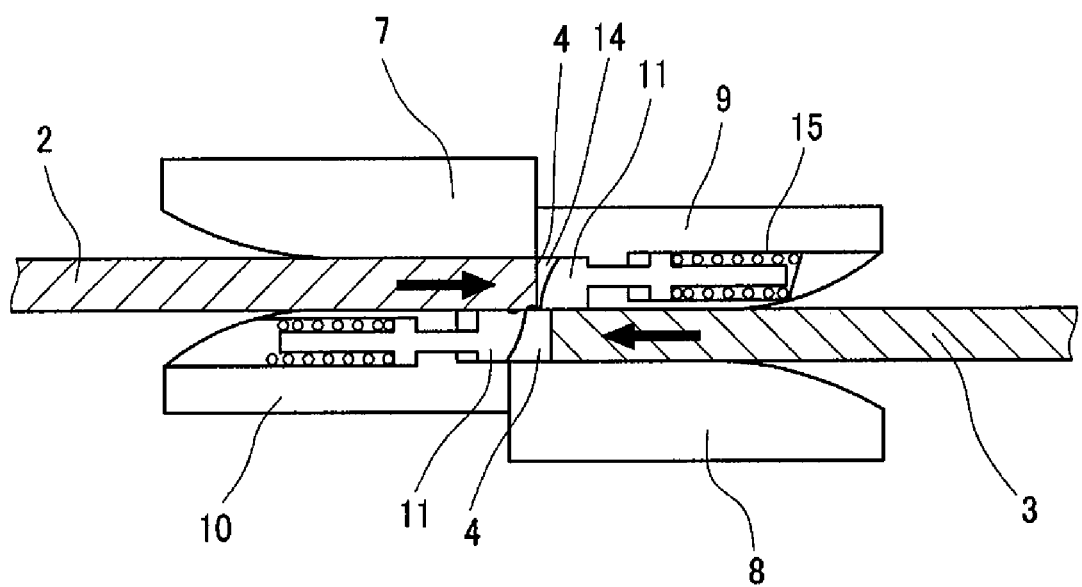
Figure 2C:
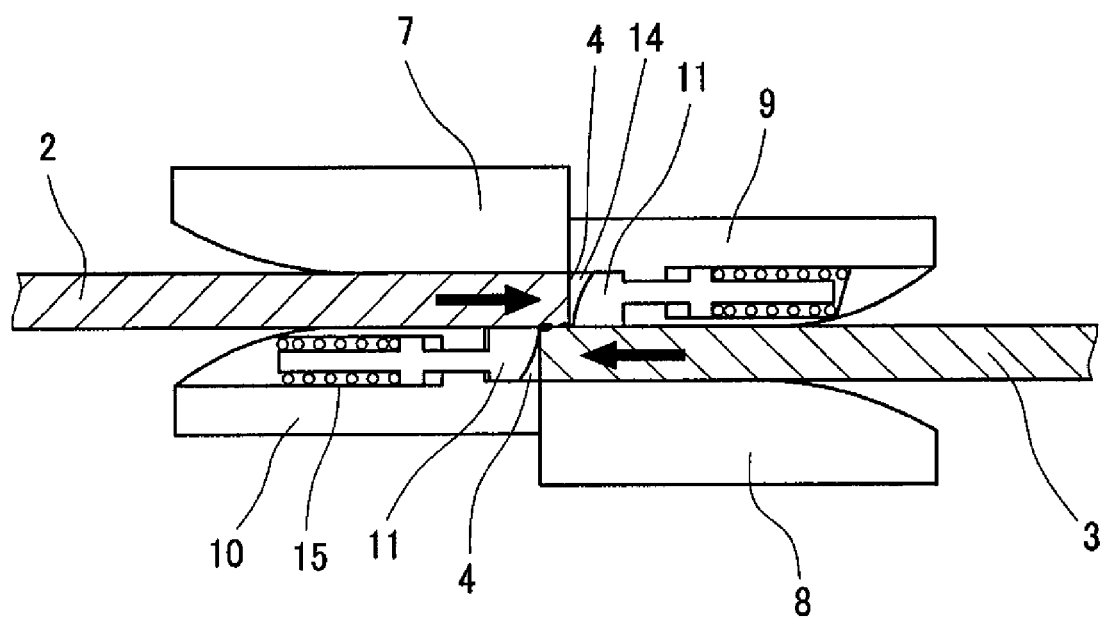

As shown in FIGS. 2A, 2B, and 2C, the left metal plate 2 is forcibly inserted into the bonding molds 7 and 8 through a left trumpet-shaped entrance 19 by inserting rollers 20. In this case, an exhausting spring 15 mounted on the upper clamp 9 is contracted by an inserting force of the left metal plate 2 and an overlapped surface 5 of a right metal plate 3 is shaved by a shaving blade 12 of a right shaving mold 11. Therefore, the oxidation film coated on the right metal plate 3 is shaved and simultaneously the oxidation film remnant is gathered to a remnant keeping home 13 of the shaving mold 11. In the same manner, the right metal plate 3 is forcibly inserted into the bonding molds 7 and 8 through a right trumpet-shaped entrance 19 by inserting rollers 20. In this case, an exhausting spring 15 mounted on the lower clamp 10 is contracted by the inserting force of the right metal plate 3 and the overlapped surface 5 of the left metal plate 2 is shaved by a shaving blade 12 of a left shaving mold 11. Therefore, the oxidation film of the left metal plate 2 is shaved and simultaneously the oxidation film remnant is gathered to a remnant keeping home 13. In this manner, the left and right metal plates 2 and 3 are overlapped in states that the oxidation film of the overlapped surfaces 5 is removed.

FIG. 3 shows a process for bonding the overlapped metal plates through a plastic flow in the bonding mold according to the exemplary embodiment of the present invention.

Figure 3A:
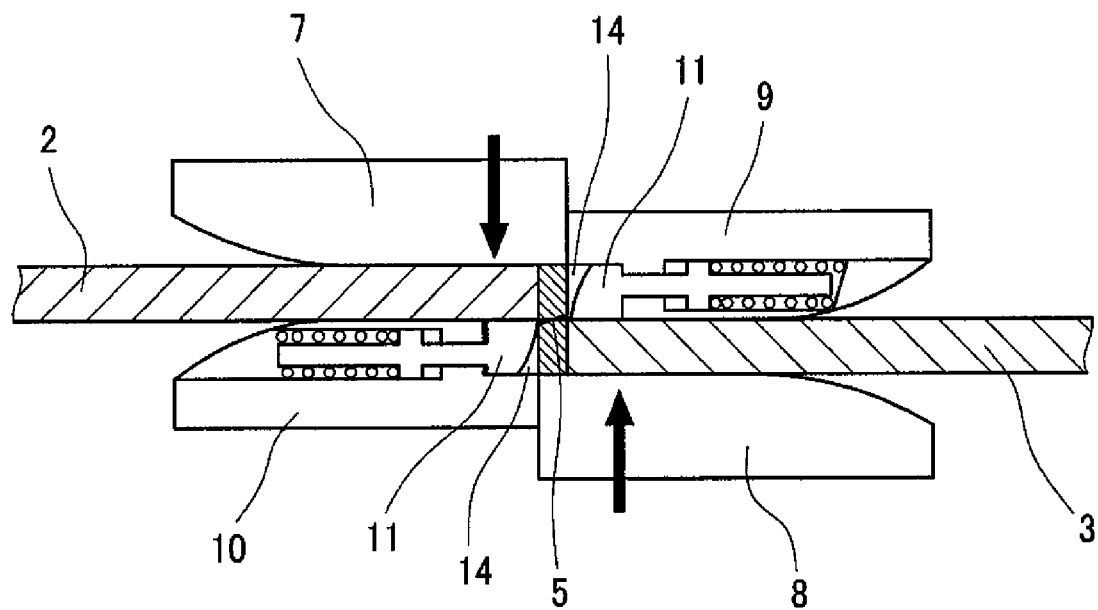
FIG. 3 shows a process for bonding the overlapped metal plates through a plastic flow in the bolding mold according to the exemplary embodiment of the present invention.

As shown in FIG. 3A, the right metal plate 3 is clamped so as not to move right by the upper clamp 9 and the confronting lower bonding mold 8, and the left metal plate 2 is clamped so as not to move left by the lower clamp 10 and the confronting upper bonding mold 7. Therefore, the metal plates I cannot move in the width direction of the metal plates 1. In this state, the upper bonding mold 7 is slid down by a bonding cylinder 22 and applies pressure downwardly to the overlapped surfaces 5 of the left and right metal plates 2 and 3.

Figure 3B:
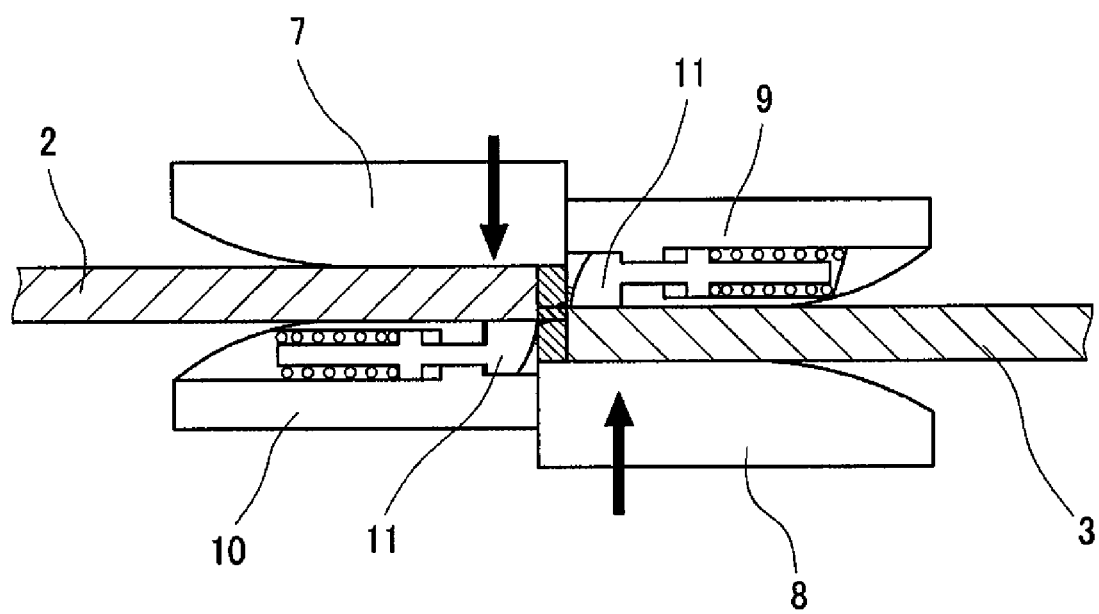
Figure 3C:
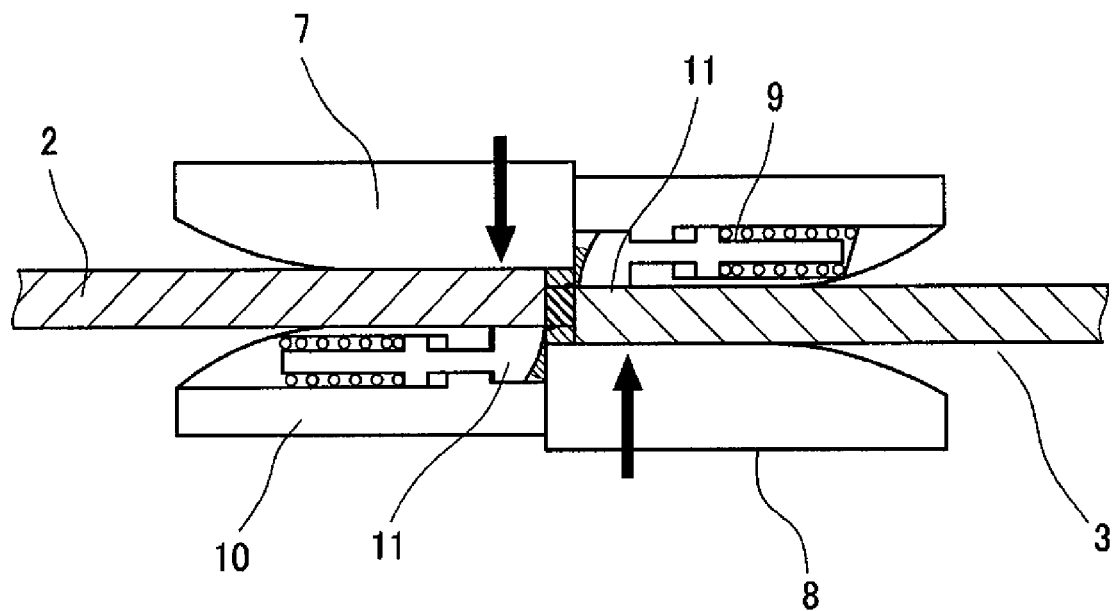
Figure 3D:
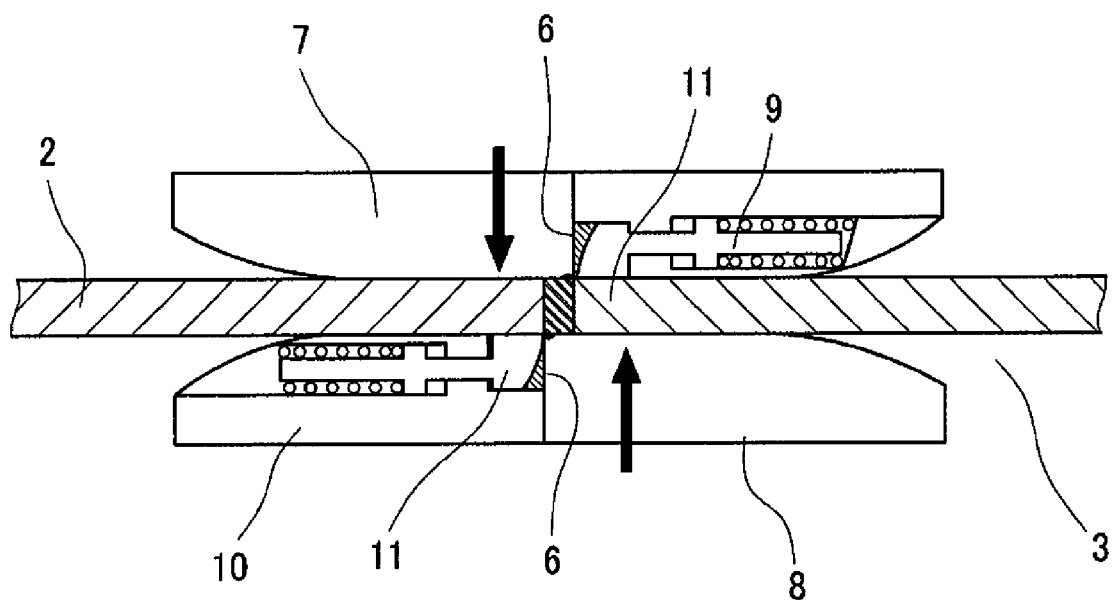

As shown in FIGS. 3B, 3C, and 3D, when the overlapped portions of the left metal plate 2 and the right metal plate 3 are bonded through the plastic flow, the excess metal 6 and the oxidation film are pushed out and removed to the trapezoidal-shaped excess metal keeping homes 14 that are formed between curved portions 12a of the shaving molds 11 and the upper and lower clamps 9 and 10. In addition, when the upper and lower bonding molds 7 and 8 and the upper and lower shaving molds 11 meet together, the bonding process is completed and simultaneously the process for removing the excess metal 6 is completed. Therefore, the process for removing an oxidation film and the process for bonding two metal plates 1 are simultaneously completed.

Figure 4:
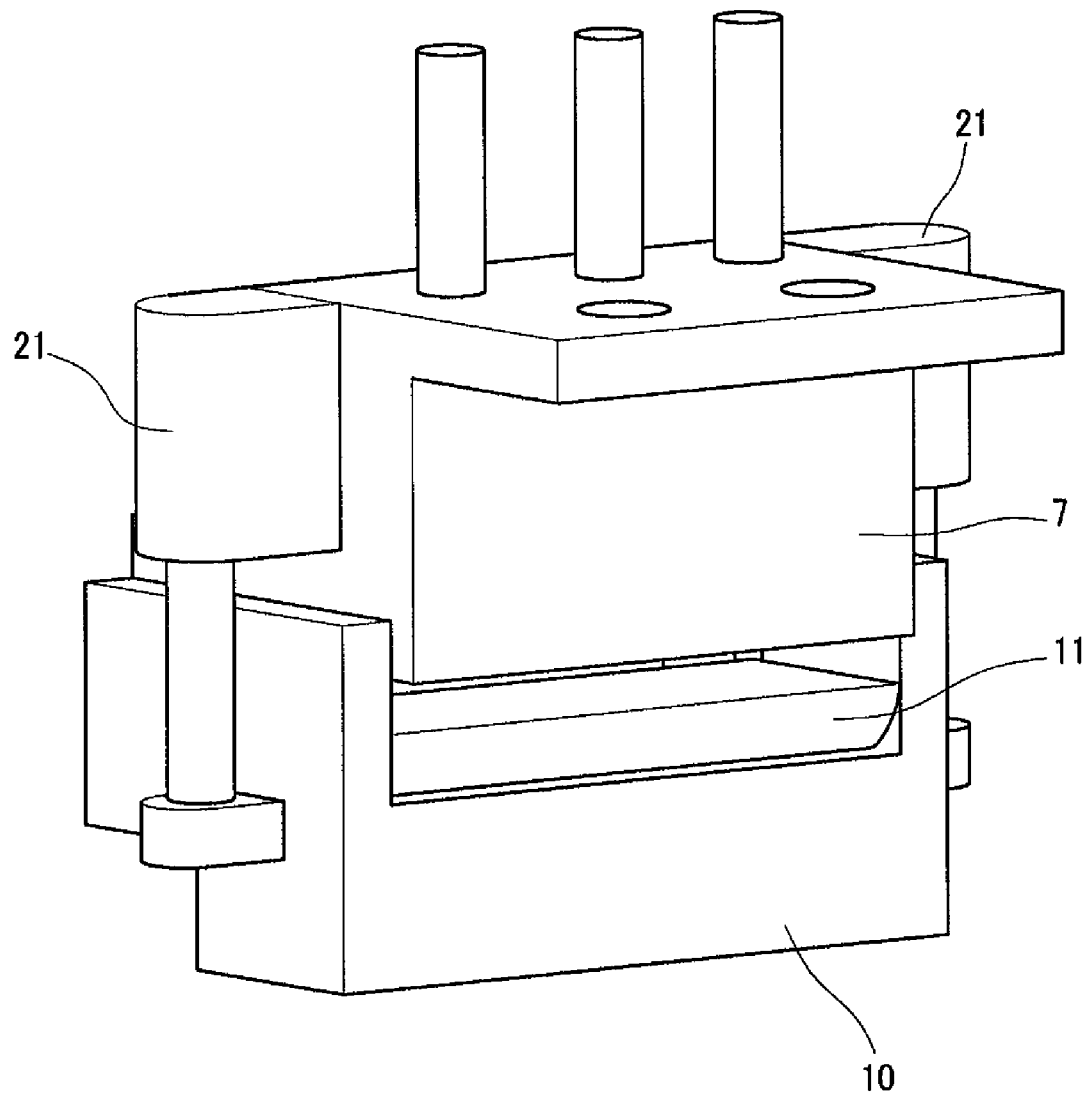
FIG. 4 shows a perspective view of an upper bonding mold and a lower clamp connected to the upper bonding mold according to the exemplary embodiment of the present invention.

FIG. 4 shows a perspective view of an upper bonding mold and a lower clamp connected to the upper bonding mold according to the exemplary embodiment of the present invention.

As shown in FIG. 4, a bonding load is applied to the heated and overlapped metal plates 1. The upper bonding mold 7 is formed as a male form and the lower clamp 10 is formed as a female form that encloses the upper bonding mold 7. The upper bonding mold 7 and the lower clamp 10 are closely engaged so that the position where the metal plates 1 are overlapped is precisely fixed and the metal plates 1 are not pushed out in the width direction of the metal plates 1. In addition, the clamping cylinder 21 of the upper bonding mold 7 is connected to the lower clamp 10 with the cylinder rods so as to clamp the metal plates 1 laid between the upper bonding mold 7 and the lower clamp 10. Meanwhile, a plurality of spring insert holes are bored horizontally at an upper portion of the lower clamp 10 and a plurality of rods of the shaving mold 11 are inserted into the spring holes. A supporting portion is formed in the spring insert holes so as to support the exhausting springs 15. Therefore, the shaving mold 11 is enabled to move horizontally and the exhausting springs 15 inserted into the spring insert holes give a restoring force to the shaving mold 11.

Figure 5:
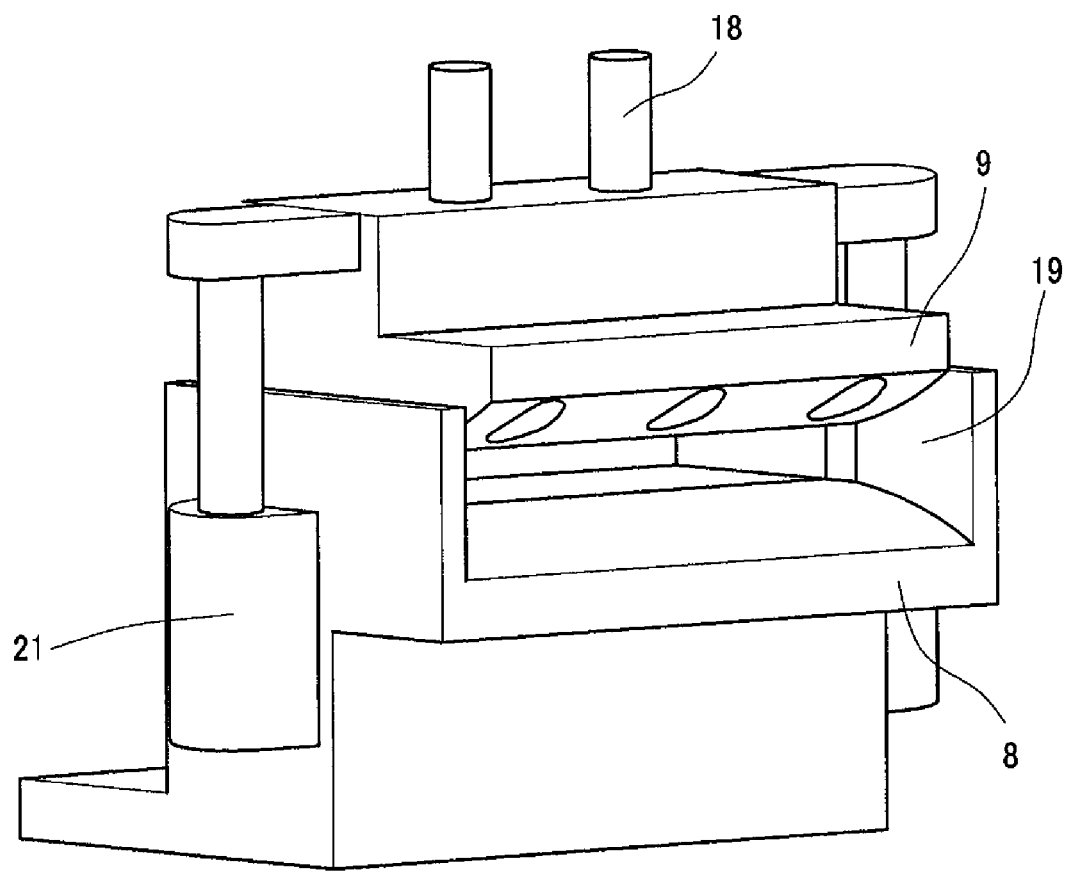
FIG. 5 shows a perspective view of a lower bonding mold and an upper clamp connected to the lower bonding mold according to the exemplary embodiment of the present invention.

FIG. 5 shows a perspective view of a lower bonding mold and an upper clamp connected to the lower bonding mold according to the exemplary embodiment of the present invention.

As shown in FIG. 5, trumpet-shaped entrances 19 are respectively formed at left and right sides of the bonding molds 7 and 8. The height of the trumpet-shaped entrances 19 increases in an outward direction so that the heated metal plates 1 are easily inserted into the bonding molds 7 and 8. The upper clamp 9 is formed as a male form and the lower bonding mold 8 is formed as a female form that encloses the upper clamp 9. The upper clamp 9 and the lower bonding mold 8, the same as the upper bonding mold 7 and the lower clamp 10, are closely engaged so that the position where the metal plates 1 are overlapped is precisely fixed and the metal plates 1 are not pushed out in the width direction of the metal plates 1. In addition, the clamping cylinder 21 of the lower bonding mold 8 is connected to the upper clamp 9 with the cylinder rods so as to clamp the right metal plate 3 laid between the lower bonding mold 8 and the upper clamp 9. Meanwhile, a plurality of spring insert holes are bored horizontally at a lower portion of the upper clamp 9 so that a plurality of rods of the shaving mold 11 are inserted into the spring insert holes. A supporting portion is formed in the spring insert holes so as to support the exhausting springs 15. Accordingly, the shaving mold 11 is enabled to move horizontally and the exhausting springs 15 inserted into the spring insert holes give a restoring force to the shaving mold 11.

Figure 6:
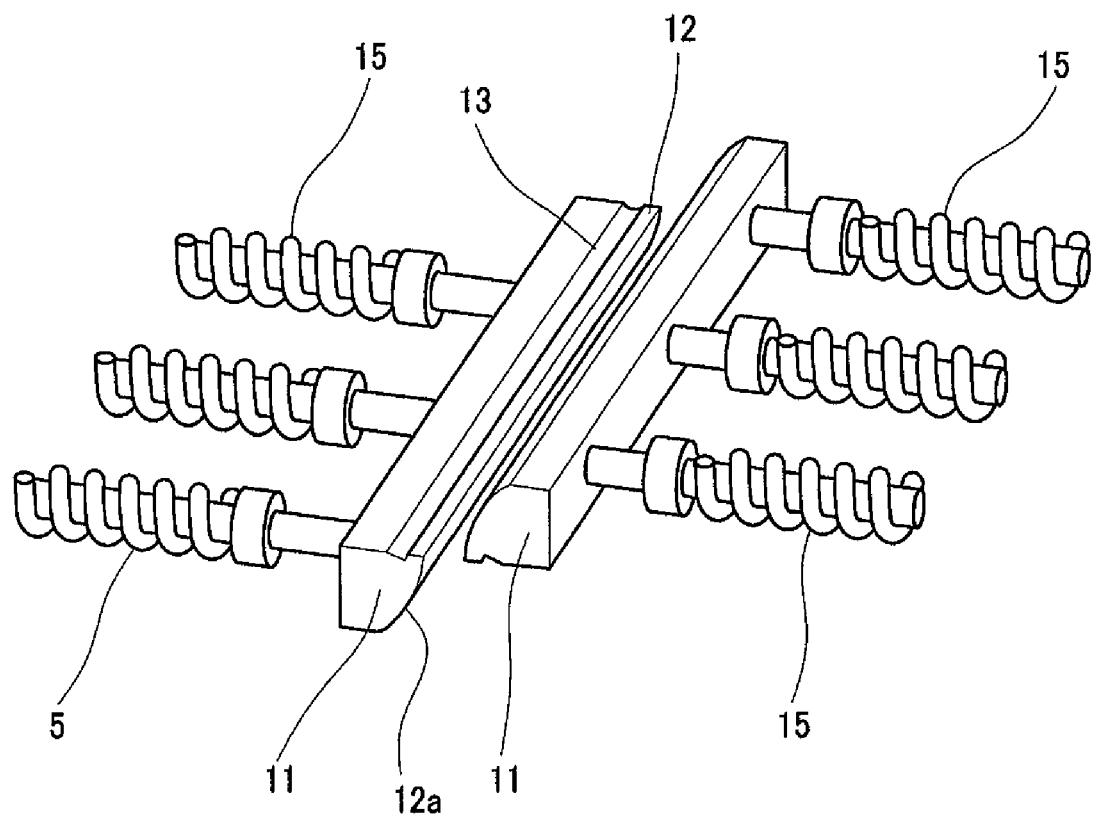
FIG. 6 shows a perspective view of shaving molds inserted into the upper and lower clamps according to the exemplary embodiment of the present invention.
Figure 7:
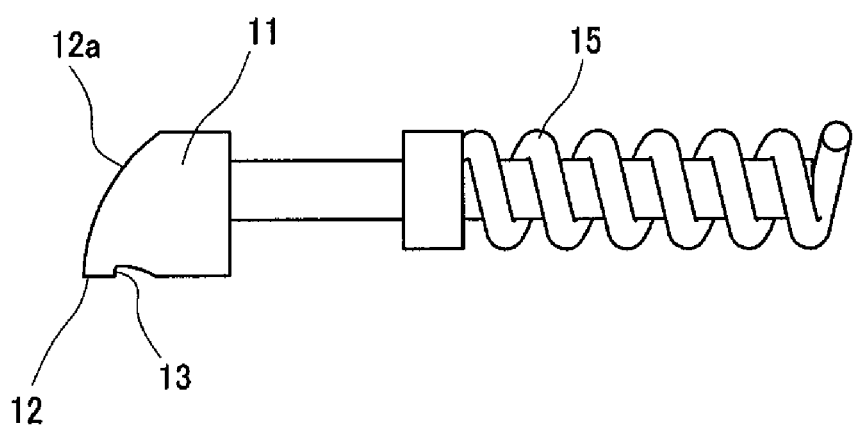
FIG. 7 shows a front view of a shaving blade and a remnant keeping home according to the exemplary embodiment of the present invention.

As shown in FIGS. 6 and 7, the shaving molds 11 have one side where a plurality of rods inserted into the spring insert holes are formed and another side where the curved surfaces 12a are formed. The shaving blades 12 for shaving the oxidation film coated on the surfaces of the metal plates 1 are formed at one end of the curved surfaces 12a that are contacted to the metal plates 1. In addition, the remnant keeping homes 13 are formed at the surfaces of the shaving molds 11 that are contacted to the metal plates 1. The shaving molds 11 are protruded by an elastic force of the exhausting springs 15. In this state, when the metal plates 1 are inserted into the bonding molds 7 and 8 and the exhausting springs 15 are contracted by an inserting force of the metal plates 1, the overlapped surfaces 5 of the metal plates 1 are respectively shaved by the shaving blades 12 of the shaving molds 11 and the oxidation film coated on the overlapped surfaces 5 is removed. In addition, excess metal keeping homes 14 are formed between front portions 4 of the metal plates 1, the curved surfaces 12a of the shaving mold 11, and the upper and lower clamps 9 and 10 so that when the overlapped metal plates 1 are compressed and bonded through the plastic flow, the excess metal 6 and the oxidation film remnants are pushed out to the excess metal keeping homes 14. In addition, when the upper and lower bonding molds 7 and 8 respectively slide up and down the shaving molds 11 and the metal plates 1 are bonded completely, the excess metal 6 is removed completely. When the upper and lower bonding molds 7 and 8 are separated, the excess metal 6 and the oxidation film stored in the excess metal keeping homes 14 are exhausted completely by the restoring force of the exhausting springs 15.

Figure 8:
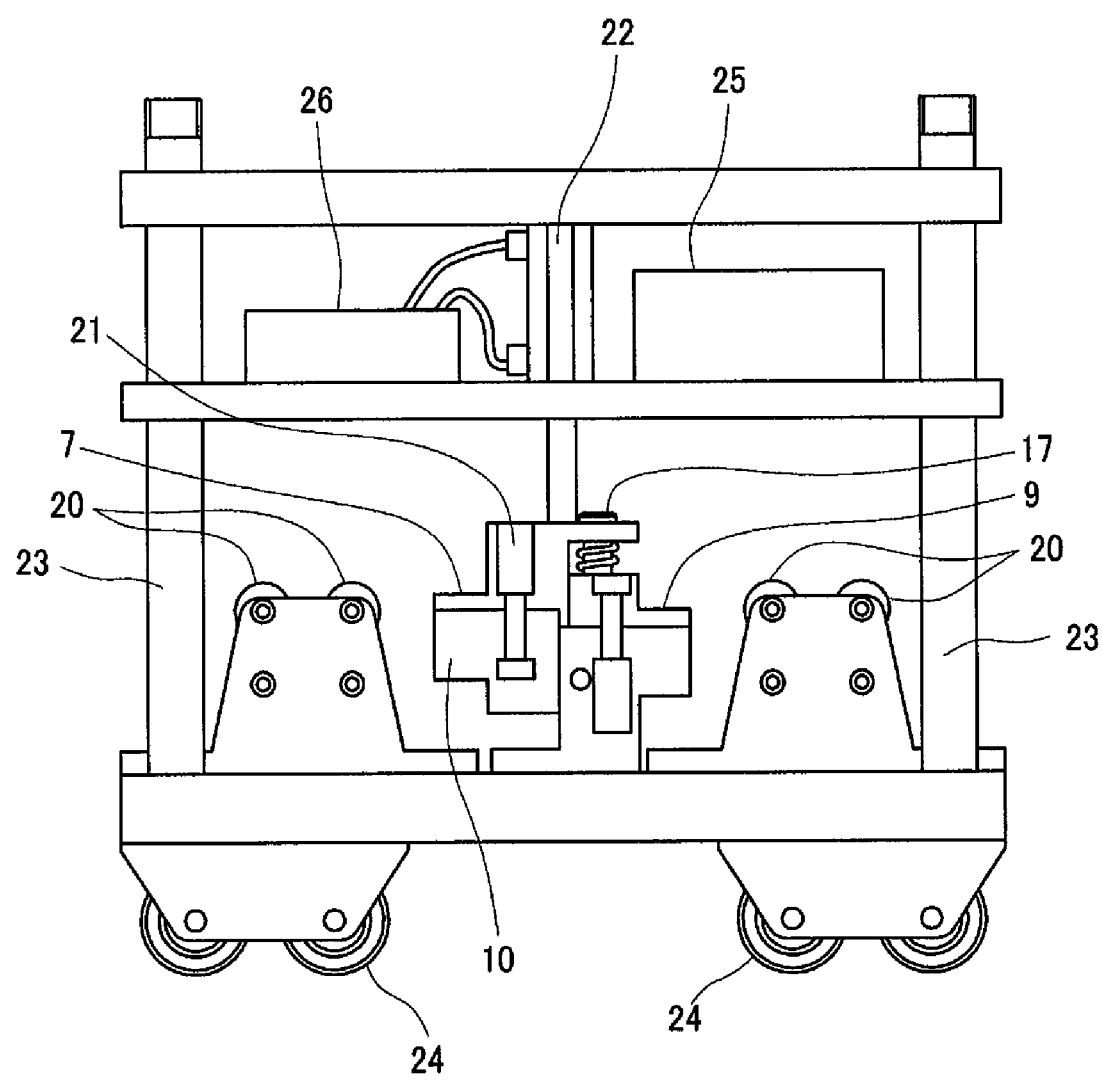
FIG. 8 shows a front view of an apparatus for hot bonding metal plates according to the exemplary embodiment of the present invention.

As shown in FIG. 1 and FIG. 8, an upper portion of the upper bonding mold 7 is elongated over the upper end of the upper clamp 9 so that the sliding rods 18 connected to the upper end of the upper clamp 9 penetrate the elongated portion of the upper bonding mold 7. Therefore, when the upper bonding mold 7 applies a compression load to the overlapped metal plates 1, the upper bonding mold 7 and the upper clamp 9 are jointed together and compress the overlapped metal plates 1 by the bonding cylinder 22 connected to the plurality of cylinder rods mounted on the upper end of the upper bonding mold 7.

Figure 9:
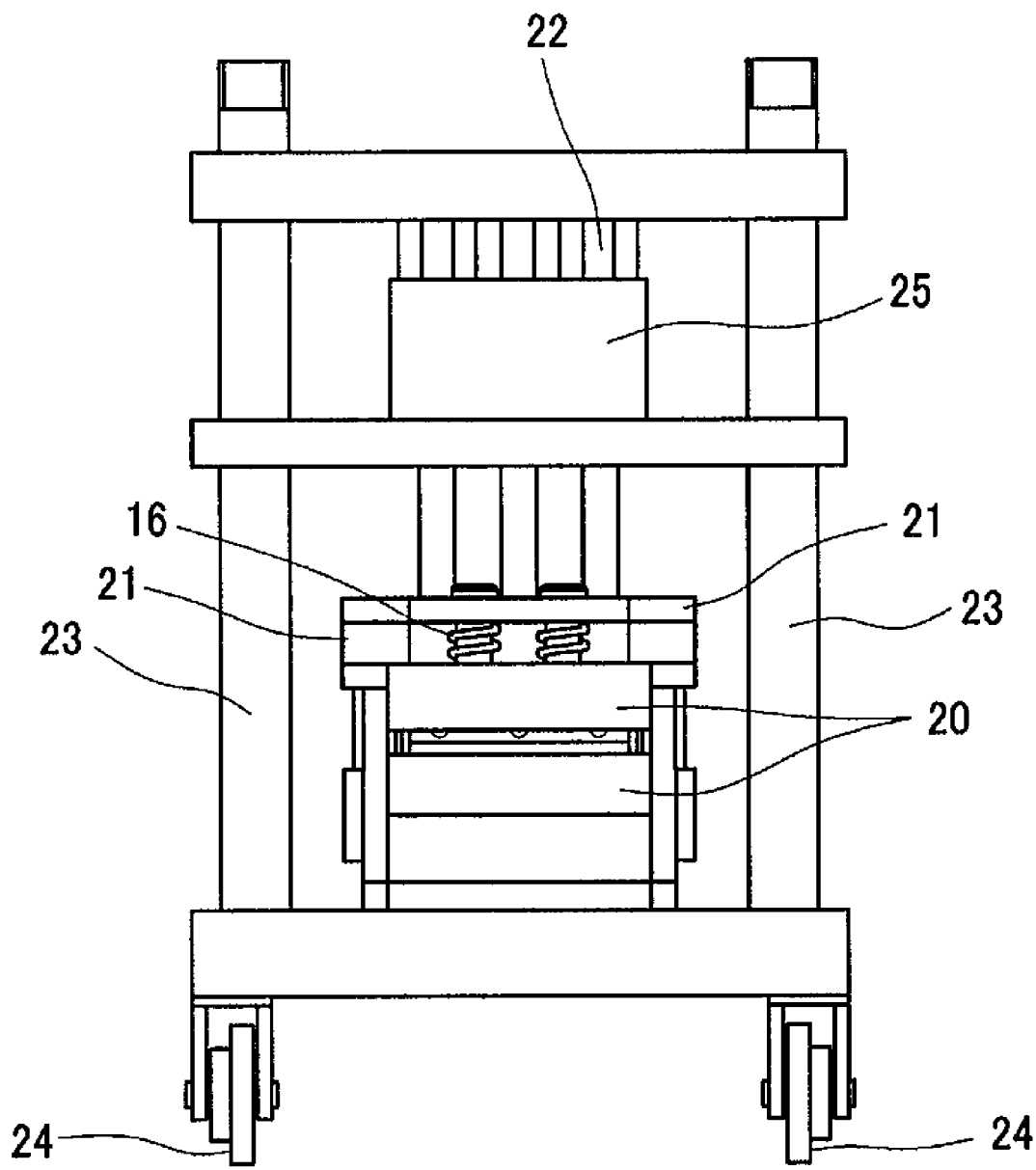
FIG. 9 shows a side view of an apparatus for hot bonding metal plates having wheels according to an exemplary embodiment of the present invention.
Figure 10:
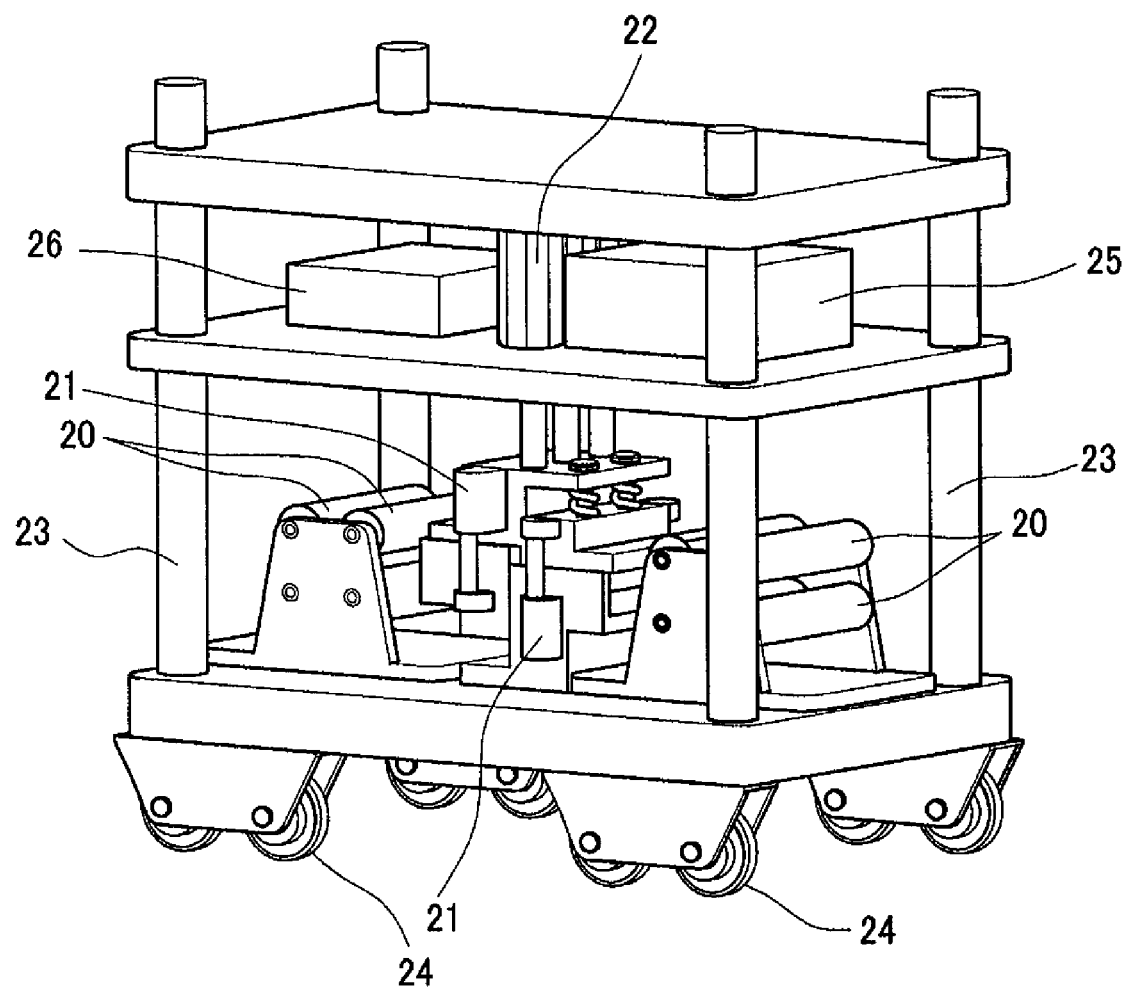
FIG. 10 shows a perspective view of the apparatus for hot bonding metal plates having the wheels according to the exemplary embodiment of the present invention.

As shown in FIGS. 8 through 10, the upper bonding mold 7 is fixed at an upper portion of a supporting frame 23 and the lower bonding mold 8 is fixed at a lower portion of the supporting frame 23. In addition, wheels 24 are mounted on the lower end of the supporting frame 23. Therefore, when a following metal plate in a moving state is inserted into the bonding molds 7 and 8 through the trumpet-shaped entrance 19 located at one side of the bonding molds 7 and 8 and pushes the bonding molds 7 and 8, a stopped preceding metal plate is inserted automatically into the bonding molds 7 and 8 through the other trumpet-shaped entrance 19 located at the other side of the bonding molds 7 and 8. After that, the preceding and following metal plates 1 move together with the bonding molds 7 and 8 at the same speed and the preceding and following metal plates 1 are bonded.

As described above, if the metal plates 1 are too thick to weld, the metal plates 1 are pressed by a strong bonding pressure and bonded through the plastic flow according to the present invention. Thus, the metal plates 1 are strongly bonded. In addition, since the oxidation film coated on the overlapped surfaces 5 of the metal plates 1 is removed and simultaneously the metal plates 1 are bonded, an additional process for removing the oxidation film is not required. Thus, productivity is enhanced. Also, since the moving metal plates 1 are inserted into the bonding molds 7 and 8 through the trumpet-shaped entrances 19 of the bonding molds 7 and 8 and laid to the exact bonding position, a process for bonding the metal plates 1 is simple and can be performed quickly. In addition, the wheels are mounted on the lower end of the bonding molds so that it is possible to bond moving metal plates. Therefore, the bonding process can be successively performed.

While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims.

Throughout this specification and the claims which follow, unless explicitly described to the contrary, the word "comprise", or variations such as "comprises" or "comprising", will be understood to imply the inclusion of stated elements but not the exclusion of any other elements.

What is claimed is:

1. An apparatus for hot bonding metal plates by applying a pressure to overlapped metal plates, comprising:
    a supporting frame;
    an upper bonding mold being mounted on an upper portion of the supporting frame and having a clamping cylinder for clamping the metal plates;
    a lower bonding mold being mounted on a lower portion of the supporting frame and having a clamping cylinder for clamping the metal plates;
    shaving molds having a shaving blade for shaving an oxidation film of the metal plates and an excess metal;
    a lower clamp being installed corresponding to the upper bonding mold, a shaving mold inserted therein so that the shaving mold can move horizontally; and
    an upper clamp being installed corresponding to the lower bonding mold, a shaving mold inserted therein so that the shaving mold can move horizontally,
    wherein pluralities of rods are respectively formed at one side of the shaving molds, pluralities of spring insert holes in which the pluralities of rods are inserted are respectively bored horizontally at a lower portion of the upper clamp and an upper portion of the lower clamp, and supporting portions for supporting exhausting springs are formed in the spring insert holes.

2. The apparatus of claim 1, wherein the clamping cylinders of the upper and lower bonding molds are respectively connected to the upper and lower clamps with cylinder rods.

3. The apparatus of claim 1, wherein the upper bonding mold and the upper clamp are formed as male forms, and the lower bonding mold and the lower clamp are formed as female forms that enclose the upper bonding mold and the upper clamp respectively so that the upper bonding mold and the lower clamp and the lower bonding mold and the upper clamp are closely engaged with each other.

4. The apparatus of claim 1, wherein the shaving molds have a curved surface at the opposite side to the one side where the rods are formed.

5. The apparatus of claim 1, wherein remnant keeping homes are formed at the one side of the shaving molds where the metal plates are contacted.

6. The apparatus of claim 1, wherein trumpet-shaped entrances in which the metal plates are inserted are formed at left and right sides of the upper and lower bonding molds and the upper and lower clamps, wherein a height of the trumpet-shaped entrances increases in an outward direction.

7. The apparatus of claim 1, wherein sliding rods are respectively mounted on upper and lower ends of the upper and lower clamps, and stoppers are respectively mounted on upper and lower ends of the sliding rods so as to control a position of the upper and lower clamps according to a thickness of the metal plates.

8. The apparatus of claim 7, wherein the sliding rods are elastically supported by protruding springs.

9. The apparatus of claim 7, wherein an upper portion of the upper bonding mold is elongated over the upper clamp, and the sliding rods connected to the upper end of the upper clamp penetrate the elongated portion of the upper bonding mold.

10. The apparatus of claim 1, wherein wheels are mounted on a lower end of the supporting frame.

* * * * *